April 5, 1960   J. M. TYLER ET AL   2,931,171
COMBINATION NOISE SUPPRESSOR AND THRUST REVERSER
Filed April 19, 1955   3 Sheets-Sheet 1
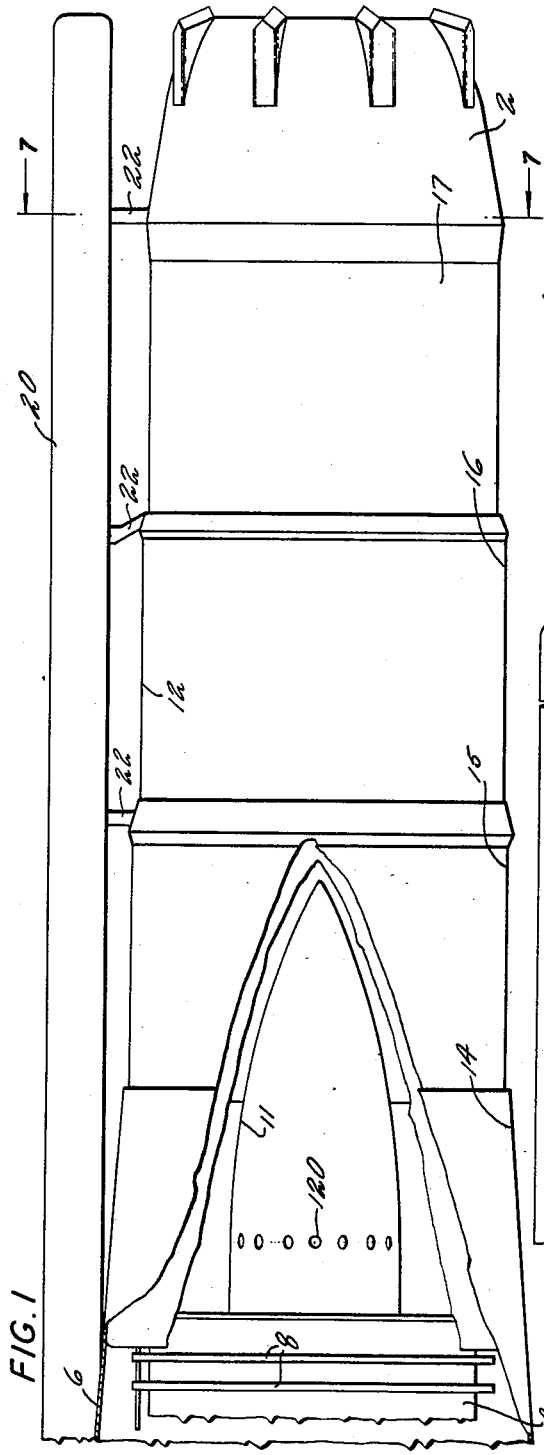
INVENTORS
JOHN M. TYLER
ERIC S. HOPE
MAXON A. LOGSDON
BY Charles G. Warren
ATTORNEY

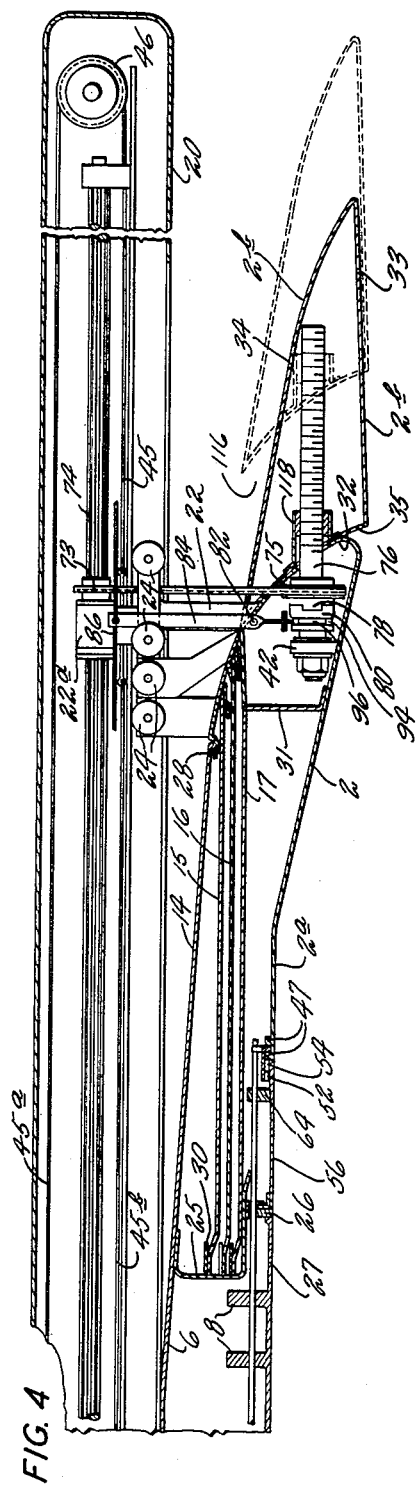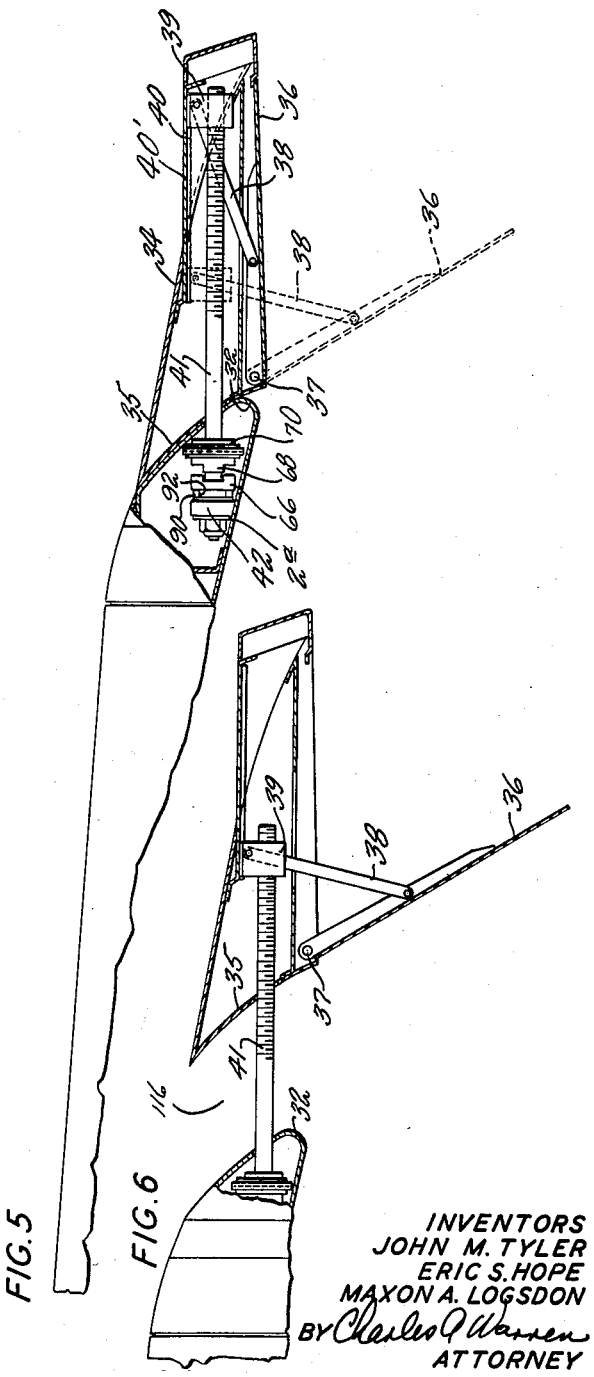

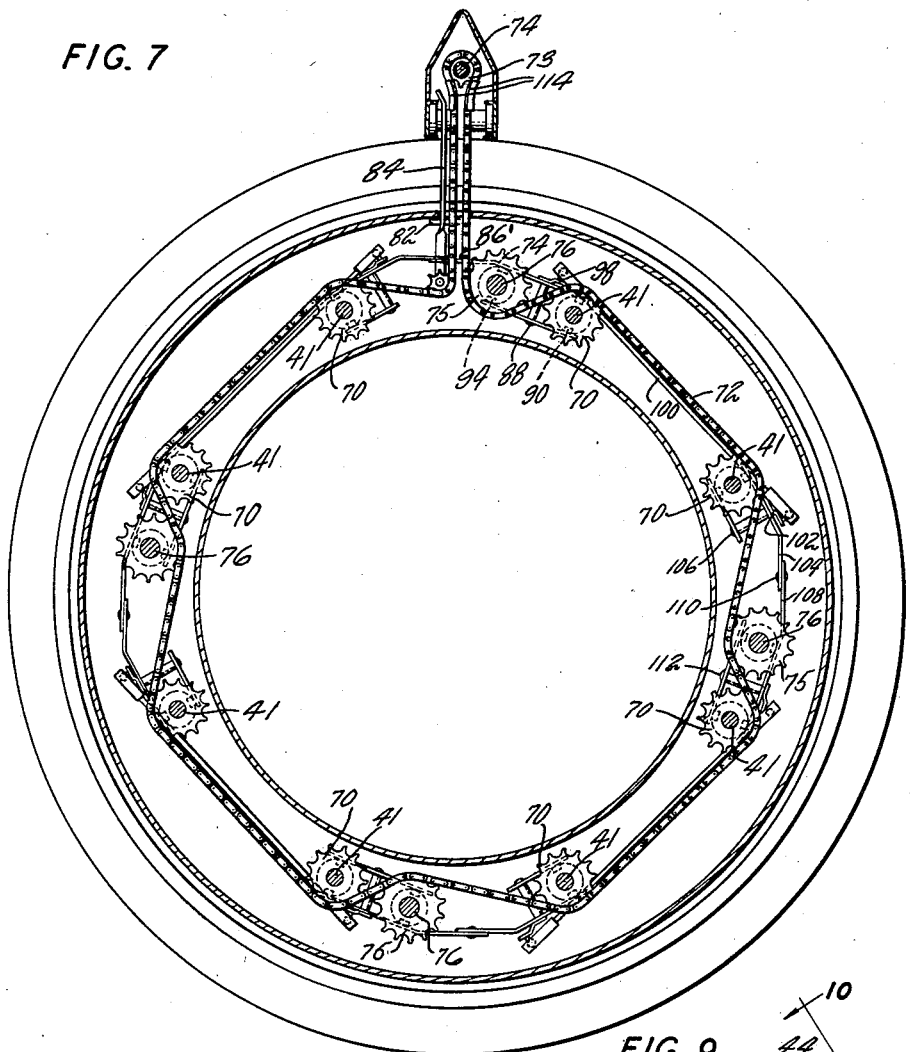

United States Patent Office 2,931,171
Patented Apr. 5, 1960

2,931,171

COMBINATION NOISE SUPPRESSOR AND THRUST REVERSER

John M. Tyler, South Coventry, Eric S. Hope, West Hartford, and Maxon A. Logsdon, East Hartford, Conn., assignors to United Aircraft Corporation, East Hartford, Conn., a corporation of Delaware Application April 19, 1955, Serial No. 502,458

11 Claims. (Cl. 60—35.54)

This invention relates to a thrust nozzle and more particularly to a thrust nozzle which will provide selectively thrust reversal or jet noise silencing.

The idea of silencing a jet by discharging the gas through a large number of relatively small rearwardly directed openings rather than through the large thrust nozzle is described and claimed in the co-pending application of Tyler Serial No. 474,807, filed December 13, 1954. One feature of the present invention is an arrangement for combining with this jet silencing an arrangement for thrust reversal which makes possible the use of certain elements of the mechanism for both purposes.

One feature of the present invention is a thrust reversal device which reverses the flow of gas for thrust reversal by shifting rearwardly the end portion of the nozzle itself. Another feature is the use of a part of the jet silencing mechanism as a part of the thrust reversal device.

One feature is the arrangement of the jet silencing mechanism so that while the silencing mechanism is in operation the device may be operated as an afterburner in combination with the jet engine to which the device is attached.

Another feature is an arrangement for retraction of the silencing mechanism to place it in an inoperative position during thrust reversal operation. Another feature is the incorporation of both a silencing device and a thrust reversal device without adversely affecting the efficiency of the nozzle in normal operating position with both silencing and thrust reversal inoperative.

Other objects and advantages will be apparent from the specification and claims, and from the accompanying drawings which illustrate an embodiment of the invention.

Fig. 1 is a side elevation of the device in extended position for jet silencing with the parts broken away.

Fig. 2 is a sectional view similar to Fig. 1 with the silencer parts in retracted position.

Fig. 3 is an end view of the device showing the closure flaps in closed position.

Fig. 4 is a fragmentary longitudinal sectional view on a larger scale showing the arrangement of the jet silencing and thrust reversal mechanism in normal engine operating position.

Fig. 5 is a view similar to Fig. 4 showing the position of the flap when closed for jet silencing, the section for Fig. 5 being angularly spaced from the section of Fig. 4.

Fig. 6 is a fragmentary view on the same section as Fig. 5 showing the position of the flap and nozzle for thrust reversal, the silencing structure being in retracted position.

Fig. 7 is a transverse sectional view substantially on the line 7—7 of Fig. 1.

Fig. 8 is a perspective view of the nozzle locking means with parts broken away.

Fig. 9 is a fragmentary sectional view showing a portion of the silencer wall substantially along the line 9—9 of Fig. 10.

Fig. 10 is a sectional view along the line 10—10 of Fig. 9.

Referring first to Figs. 1 and 2, the invention is shown in connection with the exhaust nozzle 2 of a jet engine represented schematically at 4, the engine being positioned within the cowl 6 of an airplane. Engine mounting flanges 8 which are engaged by engine mounts, not shown, support the engine within the airplane. The engine has a tailcone 11 around which the exhaust gas from the turbine is discharged.

The silencing device consists of a telescopic tube 12 made up of a series of sleeves 14, 15, 16 and 17, as shown in Fig. 4, these sleeves being arranged to fit one within the other and surrounding the tailcone 11, as shown in Fig. 4. The nozzle 2 is attached to the downstream end of the innermost sleeve 17 and is carried by the sleeve as shown, a part of the nozzle being within the sleeve as will appear later. The sleeves are guided by one or more rails 20 supported by the aircraft structure. Each sleeve 15, 16 and 17 carries at its rearward end a projecting bracket 22 having guide rolls 24, Fig. 4, which engage with the rail 20.

The forward sleeve 14 is attached at its upstream end to a part of the jet engine, as for example, by a reenforcing web 25 extending inwardly from the sleeve 14 and engaging with a flange 26 on the exhaust duct 27 of the turbine, this being the flange to which the usual exhaust nozzle is generally attached. The downstream end of the sleeve 14 has an inwardly projecting ring 28 which engages with a cooperating rearwardly projecting flange 30 on the upstream end of the adjacent sleeve 15. The cooperating ring 28 and flange 30 limit the extending movement of the sleeves with respect to each other. Suitable high temperature packing may be placed between the flange and ring to minimize leakage. Similar rings and flanges are provided on each of the sleeves.

The main or upstream portion 2a of the nozzle 2 which is within the sleeve 17 is convergent in a downstream direction and is connected to the sleeve 17 by a web 31 and also by an end web 32 connecting the downstream ends of the sleeve 17 and nozzle portion 2a and forming a closure for the space between the sleeve and the nozzle portion. The nozzle 2 has a separable axially movable end portion 2b, the inner wall 33 of which is preferably divergent, as shown. The portion 2b is in the form of a hollow ring having the inner wall 33, an outer wall 34 which is connected to the inner wall at the downstream end and diverges therefrom in an upstream direction such as to be substantially an extension of the sleeve 17. The portion 2b also has an end wall 35 at its upstream end which corresponds in shape to the wall 32 and which in normal position is in engagement therewith as shown in Figs. 4 and 5.

This portion 2b carries a closure for the nozzle. In the arrangement shown, the closure consists of a number of separate segmental flaps 36, each of which is pivoted to the nozzle portion 2b adjacent to its upstream end as by a pivot pin 37 which is carried by the inner wall 33 of the portion 2b and extends substantially tangential to the nozzle opening through the portion 2b. Each flap has a link 38 pivoted thereon at a point spaced from the pivot for the flap, and the link has a threaded lug 39 at its other end. Each of the lugs is guided for longitudinal sliding movement within the portion 2b as by guides 40 carried in boxes 40' set into the outer wall 34 of the portion 2b. Each lug is engaged by a longitudinally extending threaded rod 41 mounted for rotation in a flange 42 projecting from the main portion 2a wall of the nozzle 2. By rotating the several rods 41 simultaneously the flaps are caused to move from the inoperative position in which they are recessed in the inner wall 33 of the end portion 2b of the nozzle into the operative position shown in dotted lines in Fig. 5 in which the rearward opening in the nozzle is closed.

When the silencing device is in operation the segmental flaps 36 are moved into the operative position of Fig. 5 and the telescoping sleeves 15, 16 and 17 are caused to be moved into the extended position of Fig. 1. In this position the gas which normally escapes through the nozzle escapes through a large number of small nozzles 43, Fig. 9, in protrusions 44 formed in the sleeves 15, 16 and 17. These small silencing nozzles are described and claimed in the co-pending Tyler application Serial No. 474,807 and are not of themselves the subject matter of the present invention. The telescoping sleeves and the arrangement for supporting the sleeves in extended or retracted position are also disclosed in the above mentioned Tyler application.

One of the features of the present invention is an arrangement for extending or retracting the silencing device. As best shown in Fig. 4, this extending device involves a cable 45 positioned within the rail 20 and passing over a guide pulley 46 at the outer end of the rail. At the upstream end of the rail, the cable is connected to a suitable driving mechanism, not shown, such as a reversible air motor, which will, by pulling on the upper pass 45a of the cable, cause extension of the sleeves, or, by pulling on the lower pass 45b of the cable, cause retraction of the sleeves into the inoperative position of Fig. 4. The ends of the cable 45 are connected to an extension 22a of the bracket 22 which carries the downstream end of the innermost sleeve 17 and the nozzle 2.

When the sleeves are in the retracted position of Fig. 4, the nozzle 2 may be locked against axial movement and thereby hold the several sleeves in the position shown. To this end, the upstream end of the main portion 2a of the nozzle has spaced outwardly extending flanges 47, Fig. 4, between which is positioned an inwardly extending flange 48 on a locking ring 50 (see Fig. 8). This locking ring carries a series of inwardly extending triangularly shaped locking lugs 52 on its inner surface adjacent the upstream edge of the ring. These lugs are arranged to pass between cooperating lugs 54 on the downstream end of a duct ring 56 which forms an extension of the exhaust duct from the turbine. As the nozzle 2 and the telescoping sleeves are moved into the retracted position of Fig. 4, the lugs 52 pass between the lugs 54 and the nozzle 2 can then be clamped against axial movement by turning the ring 50 far enough so that the triangular lugs 52 and 54 are in alignment with the bases of the lugs of the two sets engaging each other.

For the purpose of turning the ring 50 in locking or unlocking the nozzle, the latter may carry circumferentially spaced projecting fingers 58 between which, when the nozzle is in the retracted position, is positioned an eccentric 60 on the end of an actuating rod 62. This rod is supported in a projecting lug 64 on the duct 56 and in the flanges 58, and is suitably turned either manually or automatically by a mechanism, not shown, for engaging or disengaging the locking lugs.

The forward motion of the sleeves cuts off the flow of gas to the silencer and the nozzle locking means effectively seals off any leakage of gas into the silencing mechanism. Conversely the rearward motion of the sleeves automatically opens up the silencing mechanism to gas flow and the closure means may be then operated as desired.

For driving the rods 41, each rod has a clutch member 66 thereon, Fig. 5, in a position to be engaged by a cooperating clutch member 68 on a sprocket 70 mounted for rotation on the rod 41. The clutch member 66 is axially slidable on but splined or keyed to the rod, as will be apparent. As shown in Fig. 7, the several sprockets 70, of which there is one for each of the flaps, are all in mesh with a chain 72 which is driven from a sprocket 73 axially slidable on but splined to a rod 74 extending axially through the rail 20. It will be apparent that as the rod 74 is rotated, the rods 41 will be correspondingly rotated if the clutch elements 66 and 68 are engaged. Accordingly, all of the segmental flaps 36 can be moved simultaneously into or out of operative position. The clutch actuating mechanism will be described later. The driving sprocket is mounted to move with the bracket 22 for sleeve 17 as will be apparent.

In addition to passing over the sprockets 70, the chain 72 also passes over four angularly spaced sprockets 75 which, as shown in Fig. 4, are mounted for rotation on threaded rods 76 extending parallel to and positioned between the rods 41. Each sprocket 75 carries a clutch element 78, Fig. 4, engaging with a cooperating clutch element 80 splined to and axially slidable on the rod 76. The rods 76 are supported by the same flange 42 that supports the rods 41.

The clutch elements are so actuated that the clutches on the rods 41 are all engaged simultaneously at which time the clutches on the rods 76 will be disengaged. Alternatively, when the clutches on the rods 76 are engaged, the clutches on the rods 41 will be disengaged, as shown in Figs. 4 and 5. For this purpose, the downstream end of sleeve 17 has a pivot pin 82, Fig. 4, on which an actuating lever 84 is pivoted. The upper end of the lever 84 which extends parallel to the bracket 22 for the sleeve 17 is connected to a cable 86 which runs approximately parallel to the cable 45 and which is connected to an actuating mechanism so that the lever 84 can be moved a short distance either clockwise or counterclockwise. The lower end of the lever 84 engages a slot in a lever arm 86' which is mounted on a fixed pivot pin 88 and carries projecting pins 90 for engagement in a groove 92 in the clutch member 66 and other projecting pins 94 engaging in a groove 96 in the clutch member 80. Thus, as the lever 84 is rocked about its pivot pin 88, the clutches on the rods 41 and 76 are alternately engaged or disengaged.

For transferring this clutch movement to all of the clutches, the lever 86 carries a laterally projecting arm 98 to which a link 100 is pivoted. The link 100 extends to the next adjacent rod 41 (proceeding in a clockwise direction) to a laterally projecting arm 102 on a lever arm 104. This lever arm is mounted on a fixed pivot pin 106 and actuates the clutch on the rod 41 adjacent thereto. The lever arm 104 is connected to an adjacent lever arm 108 by a pin 110 which is received in a longitudinal slot in the lever arm 108. The lever arm 108 is mounted on a fixed pivot 112 and actuates the clutches on the rods 41 and 76 adjacent thereto in the same manner that the lever arm 86 operates. This clutch actuating mechanism is repeated around the periphery of the nozzle wall 2, as is clearly shown in Fig. 7. It may be noted that, for the purpose of guiding the driving chain 72, the bracket 22a carries opposed guides 114 so that the chain will not interfere with the clutch actuating lever 84.

For the purpose of thrust reversal, the downstream portion 2b of the nozzle is arranged to be moved axially away from the main portion 2a of the nozzle into the dotted position of Fig. 4, thereby providing, between the main portion of the nozzle and the end portion, an annular passage 116 through which the propulsive gases may be discharged into a direction nearly opposite to the normal flow of the gases through the thrust nozzle. If desired suitable shields, not shown, may be provided for the supporting rail 20 and other adjacent parts against which the reverse thrust device may direct the gas. By making the reverse flow area larger than the normal nozzle area, the presence of shielding will not be detrimental.

For the purpose of moving the end portion of the nozzle rearwardly, each threaded rod 76 engages with a nut 118 positioned within the nozzle portion 2b and mounted on the wall 35. When the rods 76 are caused to rotate, the movable portion 2b will be carried rearwardly away from the main portion of the nozzle. When this occurs, since the rods 41 are stationary at this time, the threaded lugs 39 do not move with respect to the main portion of the nozzle, but the pivot point for each flap 36 moves with the portion 2b of the nozzle. Thus the pivot point 37 is carried toward the threaded lugs 39 and causes the flaps 36 to be moved in the position of Fig. 6. Since the flaps 36 effectively close the nozzle 2b for flow of gas therethrough, the propulsive gas is discharged through the annular passage 116, thereby producing a reverse thrust. It will be understood that the end portion 2b of the nozzle can be returned to its normal position of Fig. 4 by reversely rotating the threaded rods 76, as will be apparent. If desired a suitable interlock may be provided between the mechanism for thrust reversal and the nozzle locking ring 50 so that the thrust reversal can occur only when the clamp ring is locked and the silencer mechanism retracted.

The invention also contemplates afterburning within the device for the purpose of increasing thrust, with this afterburning taking place when the jet silencing structure is in operation. To this end, the tailcone 11 may have a series of fuel discharge openings 120 thereon, through which fuel may be discharged into the gas path downstream of the turbine. Since at this time the silencing device is operative (in the position shown in Fig. 1) the flaps 36 are closed and the discharge of the propulsive gas is through the small nozzles 43. In this event, the total area of these small nozzles is selected so that adequate flow area to accommodate the afterburning is provided. Suitable flameholders can be mounted on the tailcone 11 or if a self-igniting fuel, such as propyl nitrate, is used, the flameholders may be omitted. Without the flameholders, or with retractable flameholders, the engine efficiency in normal operation is in no way interfered with since the flow passages are unobstructed and substantially unaltered by the silencing mechanism or the thrust reversal mechanism.

It is to be understood that the invention is not limited to the specific embodiment herein illustrated and described, but may be used in other ways without departure from its spirit as defined by the following claims.

I claim:

1. A thrust nozzle through which a propulsive jet of fluid is discharged, said nozzle including an outer wall defining the outer boundaries for the jet, in combination with a plurality of flap means pivoted on said outer wall on axes substantially tangentially of the outer wall, first means for simultaneously moving the pivotal axes of the flaps in an axial direction to cause the flaps to move about their axes into and out of the path of the jet, and second means for actuating said flaps independent of said first means.

2. A thrust nozzle through which a propulsive jet of fluid is discharged, said nozzle including an outer wall defining the outer boundaries for the jet, in combination with a plurality of flap means pivoted on said outer wall on axes substantially tangentially of the outer wall, a link pivotally connected to each of said flaps, the end of each link opposite to its attachment to the flap being pivotally mounted on a threaded lug, threaded means engaging with each of said lugs, means carried by said nozzle for turning all of said threaded means simultaneously, and other means carried by said nozzle for shifting said pivotal axes in a direction axially of the jet.

3. A thrust nozzle through which a propulsive jet of fluid is discharged, said nozzle including an outer wall defining the outer boundaries for the jet, in combination with a plurality of flap means pivoted on said outer wall on axes substantially tangentially of the outer wall, a link pivotally connected to each of said flaps, the end of each link opposite to its attachment to the flap being pivotally mounted on a threaded lug, threaded means engaging with each of said lugs, means carried by said nozzle for turning all of said threaded means simultaneously, and other means carried by said nozzle for shifting said pivotal axes in a direction axially of the jet, said flaps being normally recessed in said outer wall.

4. The combination, with a multi-flap thrust nozzle through which a propulsive jet of fluid is discharged, a duct, containing a plurality of small nozzles, upstream of and connected to said thrust nozzle, of first means forming a part of said thrust nozzle and operatively connected to said flaps and defining a lateral discharge passage for the propulsive jet, and second means to actuate said flaps both independently of and in cooperation with said first means.

5. A thrust nozzle for the discharge of a propulsive jet of fluid therethrough including an outer duct wall and a rearward extension thereof, in combination with flaps hinged to said extension, means for moving said extension axially with respect to said wall to provide a space therebetween and links providing a connection between said flaps and said wall to cause pivotal movement of the flaps as the extension is moved axially, each link having a threaded lug thereon, and threaded rods projecting axially from said wall and threadably engaging said lugs, and means for turning all of said rods simultaneously.

6. A thrust nozzle for the discharge of a propulsive jet of fluid therethrough including an outer duct wall and a rearward extension thereof, in combination with first rotatable axially extending threaded rods extending from said wall and engaging said extension, a plurality of flaps pivotally hinged to said extension, a plurality of threaded lugs axially movably attached to said extension, a plurality of links each pivotally attached at one end to each of said flaps and at the other end to each of said threaded lugs, second rotatable axially extending threaded rods extending from said wall and engaging said lugs, and driving means for both sets of threaded rods so that said flaps may be actuated by utilizing said first rods to axially shift said extension while said lugs are stationary and also by utilizing said second rods to axially move said lugs while said extension is stationary.

7. A thrust nozzle for the discharge of a propulsive jet of fluid therethrough including an outer duct wall and a rearward extension thereof, in combination with axially extending threaded rods carried by said outer duct wall and threadedly engaging said extension and connected by rotation for shifting said extension axially with respect to said outer duct wall, flaps hinged to said extension and links pivoted on said flaps, each link having a threaded lug pivoted thereon, a second set of axially extending rods carried by said outer duct wall and threadedly engaging said lugs and connected by rotation for shifting said lugs axially and thereby pivoting said flaps about said extension, driving means for both sets of threaded rods, and clutch means for selectively driving either set from said driving means.

8. A thrust nozzle for the discharge of a propulsive jet of fluid therethrough including an outer duct wall and a rearward extension thereof, in combination with axially extending threaded rods carried by said outer duct wall and threadedly engaging said extension and connected by rotation for shifting said extension axially with respect to said outer duct wall, flaps hinged to said extension and links pivoted on said flaps, each link having a threaded lug pivoted thereon, a second set of axially extending rods carried by said outer duct wall and threadedly engaging said lugs and connected by rotation for shifting said lugs axially and thereby pivoting said flaps about said extension, a sprocket on each of said rods, a drive chain for all of said sprockets and clutch means between each sprocket and the associated rod for selectively driving either set of rods from said chain.

9. The combination, with a multi-flap thrust nozzle through which a propulsive jet of fluid is discharged, said thrust nozzle comprising an upstream and a downstream portion which have laterally extending walls which normally abut, a duct, containing a plurality of small nozzles, upstream of and connected to said thrust nozzle, and first means connected to said thrust nozzle and the flaps of said nozzle for closing the flaps and diverting the jet through said small nozzles, of second means for moving the downstream portion of said thrust nozzle away from the upstream portion of said thrust nozzle to define a lateral discharge passage, and third means independent of said first means and responsive to said second means for closing said flaps.

10. The combination with a thrust nozzle through which a propulsive jet of fluid is discharged, said thrust nozzle comprising an upstream and a downstream portion which have laterally extending walls which normally abut, means in the form of an extensible tube positioned around said thrust nozzle and having a large number of small nozzles therein, means connected to said thrust nozzle for shifting said thrust nozzle rearwardly to position said thrust nozzle at the downstream portion of the tube, closure means on the downstream portion of said thrust nozzle, and first actuating means for actuating said closure means, of second means for shifting the downstream portion of said nozzle with the closure means thereon axially away from the upstream portion of the thrust nozzle to define a lateral passage therebetween, and third means responsive to said second means to actuate said closure means.

11. The combination of an engine having an axis and a thrust nozzle defining an outlet through which a propulsive jet of fluid from the engine is discharged, said thrust nozzle comprising separable upstream and downstream sections with abutting walls extending in a direction more than perpendicular to the direction of propulsive jet discharge through said outlet and having a plurality of closure flaps pivotally attached to and recessed in said downstream section and further having links, each pivotally attached to one of said flaps at one end and pivotally attached to a projection from said upstream section at its other end, means to separate said downstream section from said upstream section to define a lateral passage therebetween and thereby pivot said flaps to a closure position to block off said thrust nozzle outlet so that all exhaust gases must be discharged through said lateral passage to reverse thrust direction and to return said downstream section to said upstream section to eliminate said lateral passage and thereby pivot said flaps to a recessed position within said downstream section, means attached to said nozzle in the form of an extensible tube forming a duct for conducting fluid to said nozzle, means for extending and retracting said tube, said tube having a large number of small nozzles through which fluid is discharged, means to move said projection with respect to said upstream section, with said downstream section abutting said upstream section, to pivot said flaps to a closure position to block said thrust nozzle outlet so that all exhaust gases must be discharged through said small nozzles to reduce jet noise, and means for introducing fuel into the tube adjacent to its upstream end.

References Cited in the file of this patent
UNITED STATES PATENTS

| | | |
|---|---|---|
| 2,417,955 | St. Clair et al. | Mar. 25, 1947 |
| 2,551,372 | Haltenberger | May 1, 1951 |
| 2,620,623 | Imbert | Dec. 9, 1952 |
| 2,648,192 | Lee | Aug. 11, 1953 |
| 2,659,199 | Thompson | Nov. 17, 1953 |
| 2,726,509 | Gist et al. | Dec. 13, 1955 |
| 2,770,944 | Jordan | Nov. 20, 1956 |

FOREIGN PATENTS

| | | |
|---|---|---|
| 56,672 | France | July 23, 1952 |
| | (Addition to 943,820) | |
| 998,358 | France | Sept. 19, 1951 |
| 999,513 | France | Oct. 3, 1951 |
| 1,092,654 | France | Nov. 10, 1954 |